(12) United States Patent
Malevanets

(10) Patent No.: US 10,905,129 B2
(45) Date of Patent: Feb. 2, 2021

(54) CONVEYOR BELT SYSTEM COMPRISING PLATES WITH A LATERAL MOVEMENT STOP

(71) Applicant: PRINCE CASTLE LLC, Carol Stream, IL (US)

(72) Inventor: Alexander Malevanets, Vernon Hills, IL (US)

(73) Assignee: Prince Castle LLC, Carol Stream, IL (US)

( * ) Notice: Subject to any disclaimer, the term of this patent is extended or adjusted under 35 U.S.C. 154(b) by 239 days.

(21) Appl. No.: 15/957,653

(22) Filed: Apr. 19, 2018

(65) Prior Publication Data

US 2019/0320664 A1    Oct. 24, 2019

(51) Int. Cl.
*A21B 1/48* (2006.01)
*B65G 15/52* (2006.01)

(52) U.S. Cl.
CPC ........... *A21B 1/48* (2013.01); *B65G 15/52* (2013.01); *B65G 2812/02128* (2013.01)

(58) Field of Classification Search
CPC .... A21B 1/48; A21B 1/46; A21B 1/44; B65G 15/52; B65G 15/54; B65G 2812/02128; B65G 2201/0202; B65G 17/064; B65G 17/00; B65G 17/005; B65G 17/06; B65G 17/061; B65G 17/062; B65G 17/063; B65G 17/065; B65G 17/067; B65G 17/083; B65G 17/42; B65G 17/44; A47J 37/08; A47J 37/0857

See application file for complete search history.

(56) References Cited

U.S. PATENT DOCUMENTS

| | | |
|---|---|---|
| 3,416,645 A | 12/1968 | Jones |
| 3,465,489 A | 9/1969 | Monaghan |
| 3,876,547 A | 4/1975 | Kaess |
| 5,316,130 A | 5/1994 | Heit et al. |
| 7,987,972 B2 | 8/2011 | Hennigar et al. |
| 9,889,992 B1 | 2/2018 | Adomaitis et al. |
| 9,908,708 B1 | 3/2018 | Adomaitis et al. |
| 10,173,844 B2 | 1/2019 | Adomaitis et al. |
| 10,273,089 B2 | 4/2019 | Adomaitis et al. |
| 10,308,433 B2 | 6/2019 | Adomaitis et al. |
| 10,315,847 B2 | 6/2019 | Malkowski et al. |
| 10,464,757 B2 | 11/2019 | Bauer |
| 10,562,709 B2 | 2/2020 | Patel et al. |
| 10,689,199 B2 | 6/2020 | Lago |
| 2010/0002789 A1 | 1/2010 | Karabinis |
| 2017/0210567 A1* | 7/2017 | Malkowski .......... B65G 17/067 |
| 2018/0000284 A1 | 1/2018 | Adomaitis et al. |
| 2018/0140124 A1 | 5/2018 | Heinze et al. |
| 2019/0168968 A1 | 6/2019 | Bauer et al. |
| 2019/0320664 A1 | 10/2019 | Malevanets |

\* cited by examiner

*Primary Examiner* — Shawntina T Fuqua

(74) *Attorney, Agent, or Firm* — Andrus Intellectual Property Law, LLP

(57) ABSTRACT

A conveyor belt system f includes a conveyor belt having a plurality of spaced rods, and a plurality of slats. At least one of the slats in the plurality of slats includes a flat body portion having a top surface and a bottom surface and a lateral stop extending from one end of the flat body portion.

21 Claims, 7 Drawing Sheets

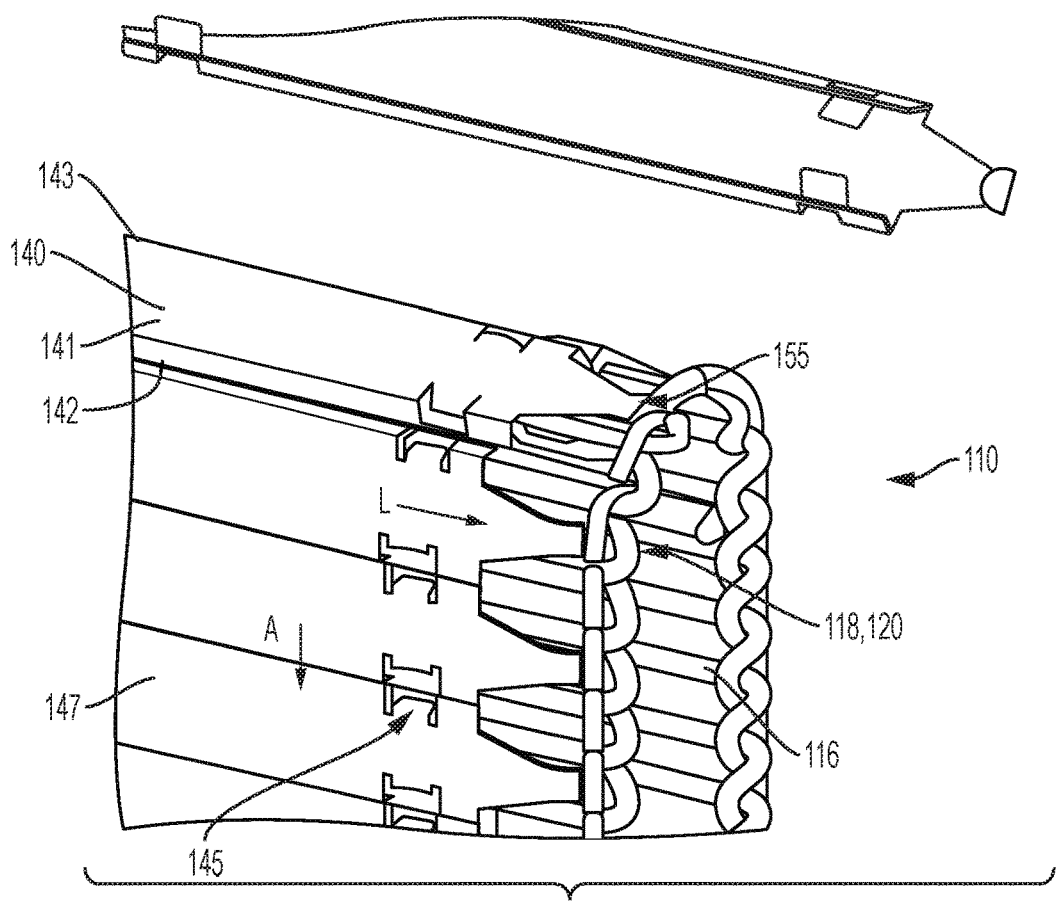
FIG. 3
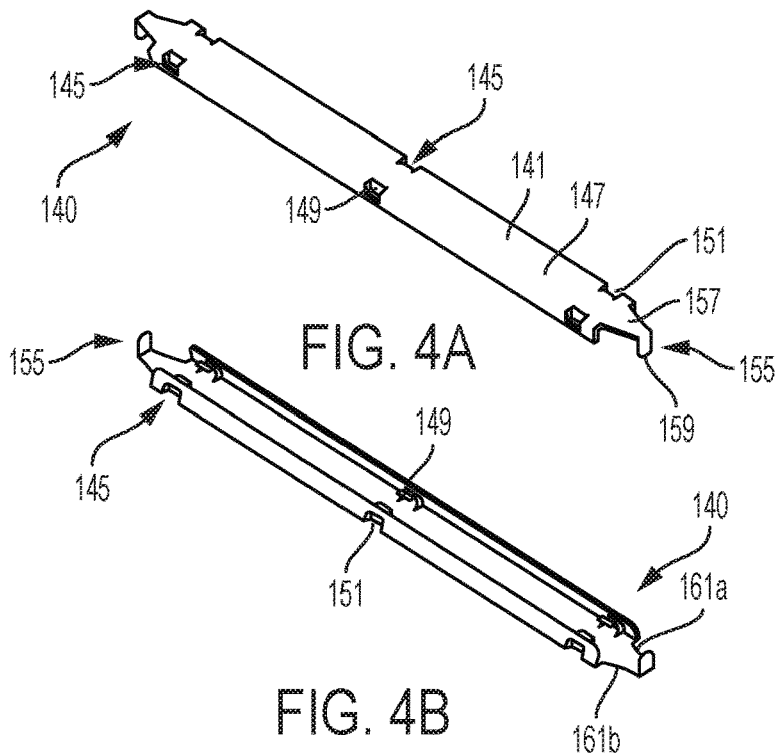
FIG. 4A
FIG. 4B

CONVEYOR BELT SYSTEM COMPRISING PLATES WITH A LATERAL MOVEMENT STOP

FIELD OF THE INVENTION

The disclosure is generally directed to a conveyor belt for conveying food items. More specifically, the disclosure is directed to conveyor belt slats or plates that have a lateral movement stop to limit lateral movement of the slat or plate relative to wire rods of a conveyor belt.

BACKGROUND

In the food service industry food items are often prepared, at least partially, by placing the food items on a conveyor belt that transports the food items into a food preparation or cooking device, such as a toaster or oven. Such toasters and ovens may include a heating device, such as a heated platen, and a slowly rotating conveyor belt. The conveyor belt holds the food item in close proximity to the platen while the conveyor belt simultaneously transports the food item through the preparation or cooking device. The length of time the food item is exposed to the heated platen may vary based on the length of the platen and the speed of the conveyor belt. Such toasters may process food items continuously as opposed to household toasters that process food items in batch mode, such as two or four pieces of bread at a time. Conveyor toasters are ill-suited for consumer use because of their size, manufacturing cost, power requirements, and the time required to pre-heat the platen to operating temperature. However, conveyor toasters are preferred by restaurants and food services that require high-volume through-put and consistent heating/toasting.

Conveyor toasters generally include a wire conveyor belt. Wire conveyor belts are ideal for handling, cooking, icing, slicing, breading, cooling, filling, inspecting, and packing of products like breads, rolls, buns, donuts, confections, cakes, pies, pastries, meat, seafood, poultry, and other processed foods. The simple, open design of wire conveyor belts provides efficient operation with minimum maintenance and easy cleanup to meet sanitation requirements. One such known wire conveyor belt is illustrated in FIGS. 1 and 2. The wire conveyor belt 10 may include a plurality of spaced metal rods 16 interconnected by coupling "hook" and "loop" connection elements 18, 20 formed at the rod ends of adjacent metal rods 16. The rods 16 may support a food item and the rods 16 may hold the components of the belt together by way of the interconnected hook and loop connection elements 18, 20. Other types of wire conveyor belts may include spaced adjacent metal rods as well. For example, a roller chain conveyor includes spaced metal rods similar to those illustrated in FIGS. 1 and 2.

One known conveyor belt, for example, is the wire conveyor belt disclosed in U.S. Pat. No. 7,987,972, which is herein incorporated by reference in its entirety. The wire conveyor belt provides a flat support surface, but is relatively expensive to produce and cumbersome to assemble. Further, the belt disclosed in the '972 patent is relatively difficult to repair or replace in the field. Still further, the plates of the '972 patent tend to slide laterally along the wire rods of the belt.

SUMMARY

According to some aspects, a conveyor belt system for moving a food product through a food preparation or cooking device includes a conveyor belt having a plurality of spaced rods, and a plurality of slats. At least one of the slats in the plurality of slats includes a flat body portion having a top surface and a bottom surface and a lateral stop extending from one end of the flat body portion.

According to another aspect, a food preparation or cooking device includes a housing, a heating element located within the housing, and a conveyor belt system. The conveyor belt system includes a conveyor belt having a plurality of spaced rods, and a plurality of slats. At least one of the slats in the plurality of slats includes a flat body portion having a top surface and a bottom surface and a lateral stop extending from one end of the flat body portion.

According to yet another aspect, a slat for a conveyor belt system includes a flat body portion having a top surface and a bottom surface and a lateral stop extending from one end of the flat body portion.

In accordance with the teachings of the disclosure, any one or more of the foregoing aspects of a conveyor belt system, a food preparation or cooking device, and/or a slat may further include any one or more of the following optional forms.

In some optional forms, the lateral stop extends laterally outward from the flat body portion to limit lateral movement along metal rods of a conveyor belt system.

In other optional forms, the lateral stop includes a plate extension and a downturned wall.

In other optional forms, the plate extension includes edges that taper towards one another extending away from the flat body portion.

In other optional forms, the least one slat is removably attached to the conveyor belt with a rod connection mechanism.

In other optional forms, the rod connection mechanism includes a downturned tab that extends downwardly from the flat body portion.

In other optional forms, the downturned tab includes a curved profile.

In other optional forms, the flat body portion includes an opening proximate the rod connection mechanism.

In other optional forms, the plate extension includes two legs.

In other optional forms, each leg terminates in a downward wall that extends away from top surface.

In other optional forms, each leg terminates in a tine.

In other optional forms, each leg includes a convex outer surface and a concave inner surface.

BRIEF DESCRIPTION OF THE DRAWINGS

FIG. 3 is a top perspective view of a conveyor belt system constructed in accordance with the teachings of the disclosure, the conveyor belt system including a plurality of slats.

FIG. 4A is a top perspective view of one slat from the conveyor belt system of FIG. 3.

FIG. 4B is a bottom perspective view of the slat of FIG. 4A.

DETAILED DESCRIPTION

Figure 1:
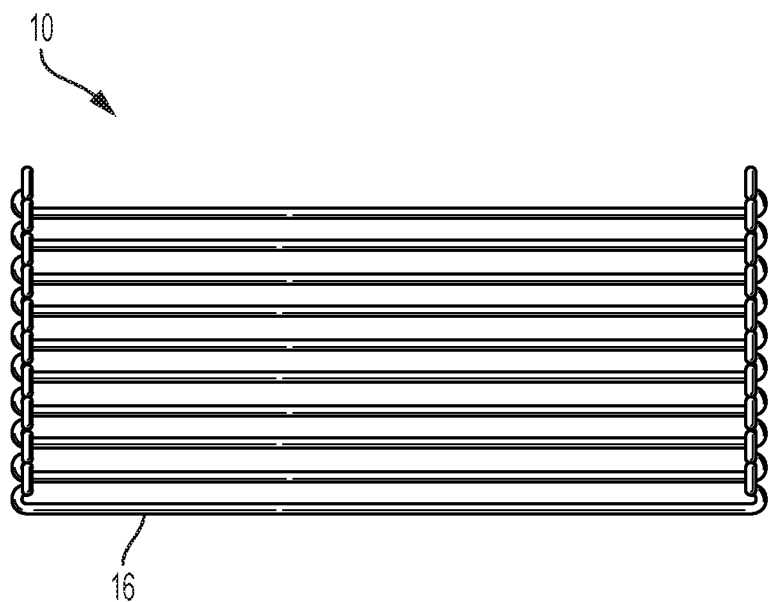
FIG. 1 is a top view of a segment of a conventional wire conveyor belt.

A conveyor belt system with a plurality of slats supports a food product and moves the food product through a food preparation or cooking device, such as a toaster or oven, without substantially marking or pinching the food product. Additionally, the conveyor belt system with slats eases assembly of the conveyor belt system while also providing the ability to replace or repair individual slats in the field without the need for specialized tools. Individual slats may be made of any material that is durable enough to withstand temperatures within the food preparation device. Examples of slat materials include metals, such as copper, iron, aluminum, and nickel, and/or metal alloys such as steel, brass, and bronze. Stainless steel, for example AISI T-304, is one preferred material for manufacturing the slats. Furthermore, the slats have a lateral stop that limits lateral movement relative to the wire conveyor belt. Slats that snap onto wire rods of conveyor belt tend to slide laterally along the wire rods due to the distance between the rod connection mechanism and the end of the wire rod and the limited friction between the rod connection mechanism and the wire rod. As a result, a portion of the slat body can extend laterally beyond the edge of the wire conveyor belt, which can cause a gap to form on an opposite side of the slat and/or cause the slat to jam against other structures close to the conveyor belt. The lateral stops of the slats described herein limit lateral movement of the slat relative to the wire conveyor belt, thus advantageously preventing gaps from forming and/or preventing the body of the slat from jamming against structures close to the conveyor belt. The lateral direction is defined as being perpendicular to a direction of conveyance of the conveyor belt.

Turning now to FIGS. 3-4B, a plurality of slats 140 is attached to spaced metal rods 116 of a wire conveyor belt to form a conveyor belt system 110. Each slat 140 includes a flat base portion 141 having a leading edge 142 and a trailing edge 143 relative to the direction of conveyance A. A lateral direction L is defined as being perpendicular to the direction of conveyance A. Each slat 140 also includes a rod connection element 145 extending downward, away from a top surface 147 of the flat base portion 141. The rod connection element 145 is recessed from the leading edge 142 and/or from the trailing edge 143. In other words, the leading edge 142, and/or the trailing edge 143, extends outward beyond the rod connection element 145 to form a substantially continuous edge. The rod connection element 145 removably secures the slat 140 to a conveyor belt by grasping a metal rod 116 of the conveyor belt so that the slat 140 may be separated from the conveyor belt when desired. The rod connection element 145 leaves the leading edge 142 and the trailing edge 143 free of any attachment either with adjacent slats 140 or with the rods 116, so that adjacent slats 140 may partially rotate relative to one another, for example when rotating around a driving means, such as a sprocket.

Each rod connection element 145 forms a downturned tab 149 that extends away from the top surface 147. The downturned tab 149 may have curved profile that compliments the curvature of the rod 116. Because the downturned tab 149 is typically formed by punching out the top surface 147, an opening 151 is formed in the top surface in the vicinity of the downturned tab 149. The opening 151 gives the downturned tab 149 freedom to flex outwardly during installation of the slat 140 on the rod 116.

At each end of the flat base portion 141, a lateral stop 155 extends laterally outward. The lateral stop 155 forms a barrier to lateral movement relative to the rod 116. The lateral stop 155 is structured and arranged to but against the hook and loop connection elements 118, 120 in the conveyor belt, as illustrated in FIG. 3, thereby preventing any significant relative lateral movement.

Returning to FIGS. 4A and 4B, the lateral stop 155 includes a plate extension 157 and a downward wall 159. The plate extension 157 extends outward from the flat base portion 141 generally in the same plane as the flat base portion 141. The downward wall 159 extends downwardly away from the top surface 147 of the flat base portion 141. The plate extension 157 includes two side edges 161a, 161b that converge towards one another from the flat base portion 141 towards the downturned wall 159. The converging side edges 161a, 161b provide a stronger slat profile.

Figure 5:
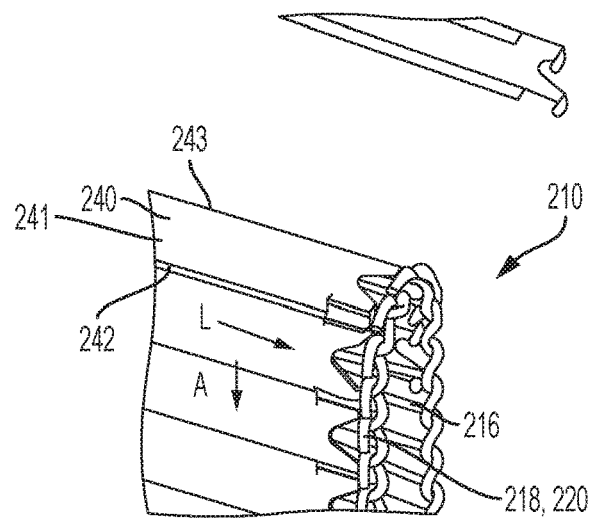
FIG. 5 is a top perspective view of another embodiment of a conveyor belt system constructed in accordance with the teachings of the disclosure, the conveyor belt system including a plurality of slats.
Figure 6A:
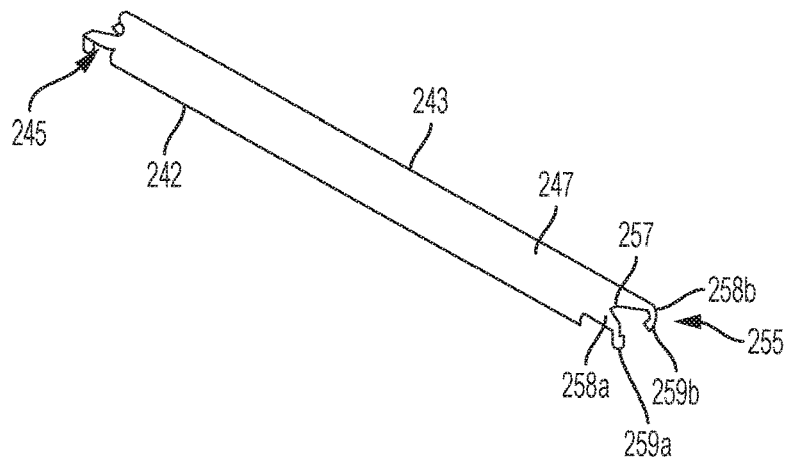
FIG. 6A is a top perspective view of one slat from the conveyor belt system of FIG. 5.
Figure 6B:
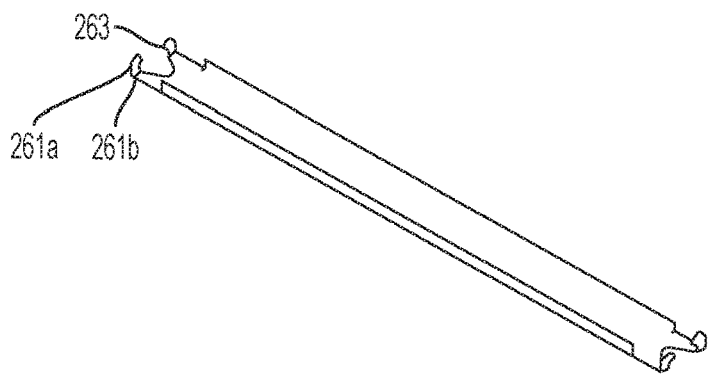
FIG. 6B is a bottom perspective view of the slat of FIG. 6A.

Turning now to FIGS. 5-6B, a second embodiment of a conveyor belt system 210 constructed in accordance with the teachings of the disclosure is illustrated. A plurality of slats 240 is attached to spaced metal rods 216 of a wire conveyor belt to form the conveyor belt system 210. Each slat 240 includes a flat base portion 241 having a leading edge 242 and a trailing edge 243 relative to the direction of conveyance A. A lateral direction L is defined as being perpendicular to the direction of conveyance A. Each slat 240 also includes a rod connection element 245 that extends downward, away from a top surface 247 of the flat base portion 241. The rod connection element 245 is a cutout of the top surface 247. The rod connection element 245 is recessed from the leading edge 242 and/or from the trailing edge 243. In other words, the leading edge 242 and/or the trailing edge 243, extends outward beyond the rod connection element 245 to form a substantially continuous edge. The rod connection element 245 removably secures the slat 240 to a conveyor belt by grasping a metal rod 216 of the conveyor belt so that the slat 240 may be separated from the conveyor belt when desired. The rod connection element 245 leaves the leading edge 242 and the trailing edge 243 free of any attachment either with adjacent slats 240 or with the rods 216, so that adjacent slats 240 may partially rotate relative to one another, for example when rotating around a drive element, such as a sprocket.

At each end of the flat base portion 241, a lateral stop 255 extends laterally outward. The lateral stop 255 forms a barrier to lateral movement relative to the rod 216. More specifically, the lateral stop 255 buts against the hook and loop connection elements 218, 220 in the conveyor belt, as illustrated in FIG. 5.

Returning to FIGS. 6A and 6B, the lateral stop 255 includes a plate extension 257 that splits into a pair of legs 258a, 258b. The plate extension 257 extends outward from the flat base portion 241 generally in the same plane as the flat base portion 241. Each leg terminates in a downward wall 259a, 259b that extends away from the top surface 247 of the flat base portion 241. Each leg 258a, 258b includes an outer convex edge 261a and an inner concave edge 261b. The outer convex edge 261a allows easy insertion of the slat 240 between rods 216, the outer convex edge 261 advantageously enabling the downturned wall 259a, 259b to flex inwardly and seat between rods 216. Each downturned wall 259a, 259b terminates in a tine or hook 263. The tines or hooks 263 attach to the belt for containment of the slat.

Figure 2:
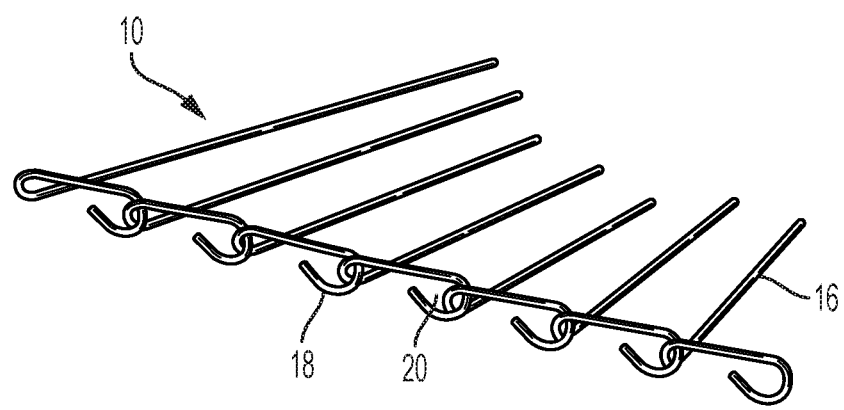
FIG. 2 is a side perspective view of the conventional wire conveyor belt of FIG. 1.

In some embodiments, the conveyor belt system may include a wire conveyor belt assembly 110, 210, and a drive mechanism, such as a drive sprocket (not shown). The wire conveyor belt assembly 110, 210 includes a wire conveyor belt and a plurality of removable slats 140, 240. While the wire conveyor belt may take the form illustrated in FIGS. 1 and 2, having hook and loop connection elements, the wire conveyor belt may have any other known form that includes spaced metal rods (e.g., a roller chain conveyor belt). The plurality of slats 140, 240 forms a substantially continuous flat support surface for conveying an item, particularly a food item through a food preparation or cooking device, such as a toaster or oven.

The conveyor belt comprises a plurality of spaced metal rods 116 disposed in succession and transversely with respect to a direction of conveyance. The plurality of spaced rods 116, 216 form the wire conveyor belt which serves, in part, as a scaffolding for the plurality of removable slats 140, 240. The wire conveyor belt also interacts with the drive mechanism, to move the rods 116, 216 and the removable slats 140, 240 through the food preparation or cooking device. Other scaffoldings capable of receiving removable slats 140, 240 may also be used. In the embodiment illustrated in FIGS. 3 and 5, each rod 116, 216 has two end portions and a supporting rod portion extending therebetween. Each end portion includes a terminal hook connection element 118, 218 that protrudes in a first direction, curves, and extends in a direction substantially opposite to the first direction for a predetermined distance. Each rod 116, 216 also has two loop connection elements 120, 220, which are formed in the rods 116, 216 themselves. The hook connection elements 118, 218 are interconnected/coupled to the loop connection elements 120, 220 of an adjacent spaced metal rod 116, 216 to interlock adjacent metal rods 116, 216 to one another. The hook connection elements 118, 218 and the loop connection elements 120, 220 interact to allow adjacent rods 116, 216 to pivot about an axis of the rod 116, 216, for example while turning around the sprocket, while securing adjacent rods 116, 216 to one another.

The slats 140 form a top side or support side and a bottom side. The top side forms a substantially flat support surface for conveying the food product, and the bottom side forms a platform that is at least partially supported by the rods 116, 216. In some embodiments, the slats 140, 240 may be welded to the rods 116, 216 after installation.

The support surface is formed by the plurality of slats 140, 240 which are coupled to selected rods 116, 216 of the plurality of spaced metal rods 116, 216. The slats 140, 240 are secured at least partially to a first spaced rod 116, 216 of the plurality of spaced rods 116, 216 and to a second spaced rod 116, 216, the second spaced rod 116, 216 being separated from the first spaced rod 116, 216. The first and second spaced rods 116, 216 support the slat 140, 240 so that a leading edge 142, 242 and a trailing edge 143, 243 extend beyond the first and second spaced rods 116, 216, respectively, and the leading edge 142, 242 and the trailing edge 143, 243 are unsecured and free of any attachment, but supported along the bottom, thereby providing a joint that allows adjacent slats 140, 240 to partially rotate relative to one another at the leading edge of each slat 140, 240 and at the trailing edge of each slat 140, 240, for example, when the slats 140, 240 turn around the drive mechanism.

The removable slats 140, 240 are preferably formed from a metal material, such as stainless steel, or any other suitable material. In other embodiments, the removable slats 140, 240 may be formed from extrudable materials including, but not limited to, polymers and ceramics. Exemplary metals include, but are not limited to, aluminum, brass, copper, magnesium, and steel. Aluminum alloys such as hard coated anodized aluminum, for example AA 6063-T6, are preferred. Exemplary plastics include, but are not limited to, polyvinylchlorides, polyethylenes, polypropylenes, acetals, acrylics, nylons (polyamides), polystyrene, acrylonitrile butadiene styrenes, and polycarbonates.

In the conveyor belt assemblies 110, 210 of FIGS. 3-6B, the top surfaces of the removable slats 140, 240 are generally smooth. The top surfaces may, however, be corrugated or textured to better grip an item. In other embodiments, the top surfaces of the removable slats 140, 240 may include gripping features to retain an item while the item is transported to facilitate the frictional engagement of food product carried thereon. The roughness of the surface of the removable slats 140, 240 in one embodiment may be provided by shot peening the surfaces of the slats 140, 240 using a predetermined shot size, as is disclosed in U.S. Patent Publication No. 2010/0275789, which is herein incorporated by reference in its entirety. Alternatively, the surface of the removable slat 140, 240 may have gripping features such as an abrasive coating, dimples, furrows, or protrusions that would be strong enough to grip the food product, but not so abrasive that the gripping features rip, tear, or mark the food product.

Figure 7:
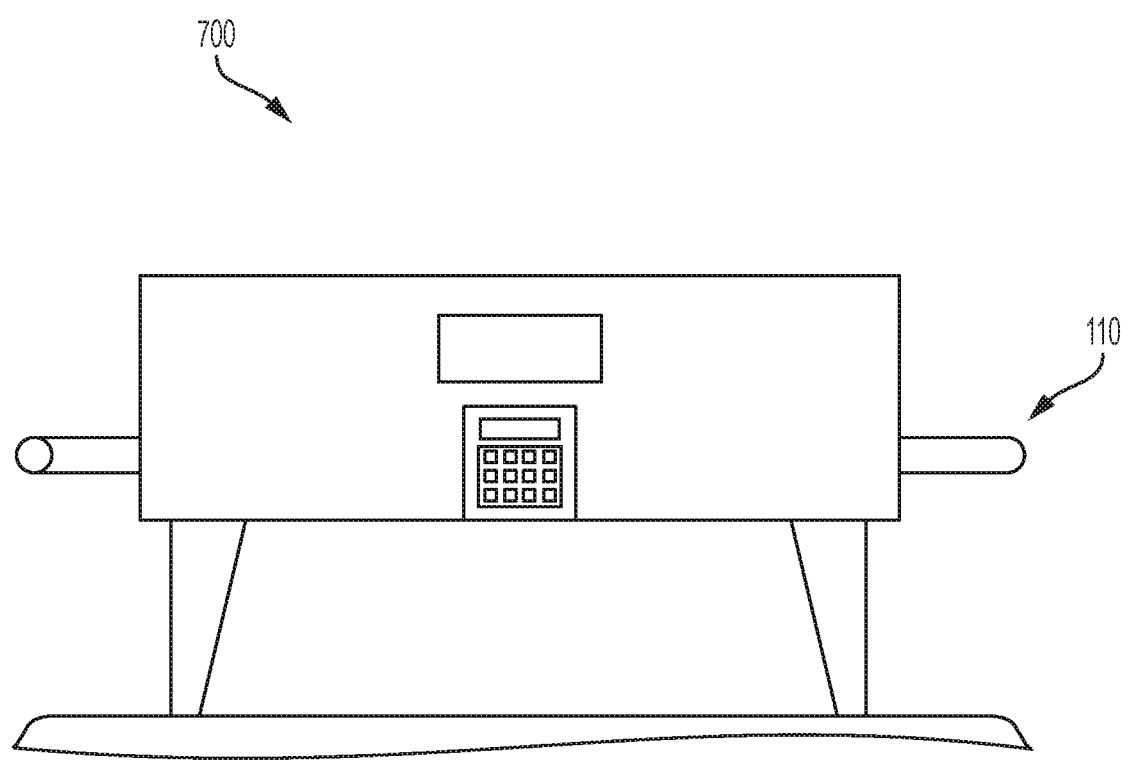
FIG. 7 is a front view of a horizontal toaster including the conveyor belt system of FIG. 3 or 5.
Figure 8:
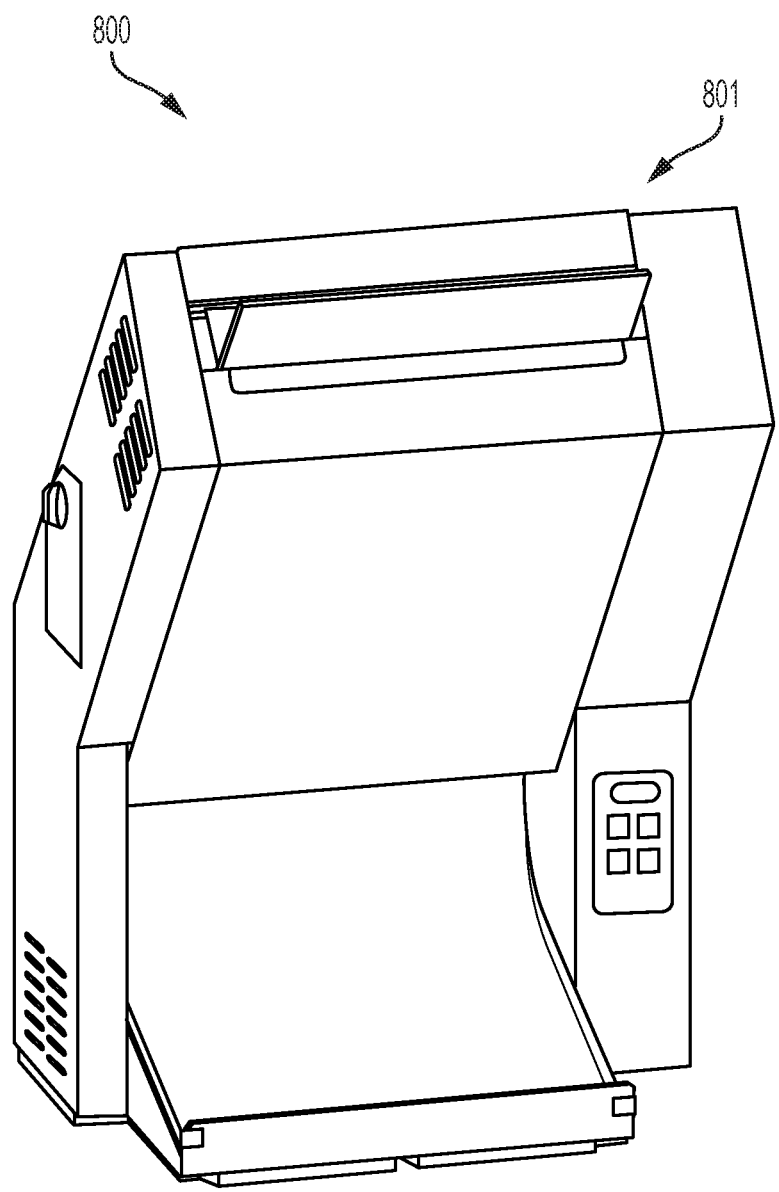
FIG. 8 is a perspective view of a vertical toaster having an angled product feed chute and including the conveyor belt system of FIG. 3 or 5.
Figure 9:
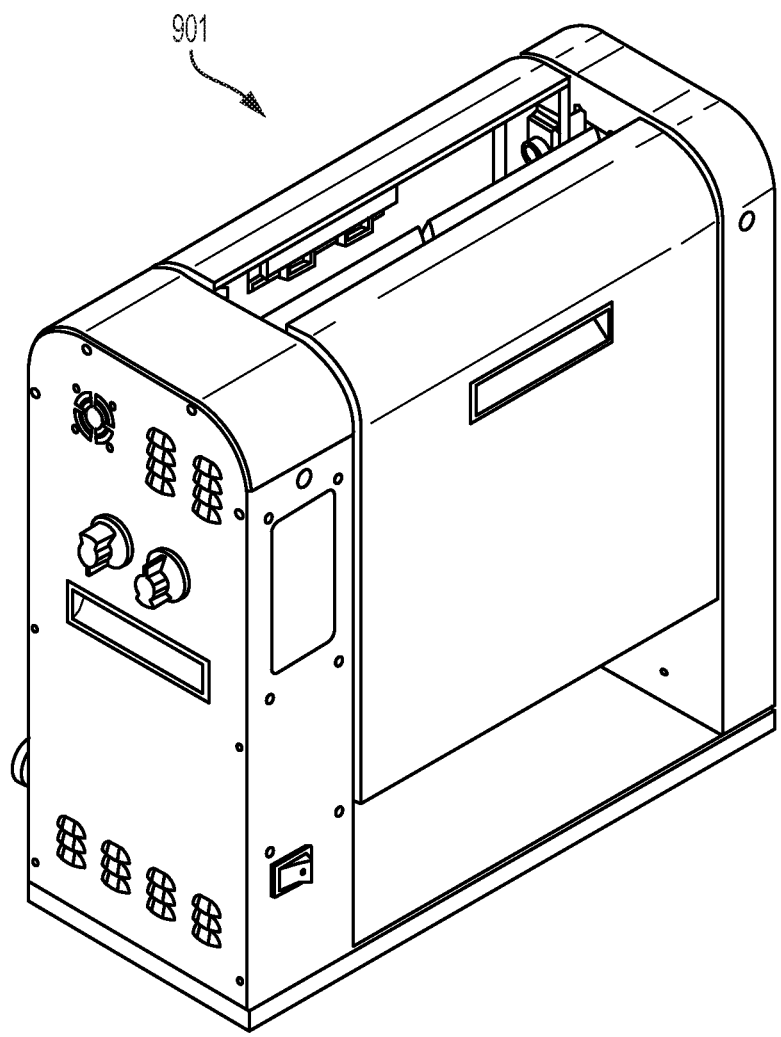
FIG. 9 is a perspective view of a vertical toaster having a vertical product feed chute and including the conveyor belt system of FIG. 3 or 5.
Figure 10:
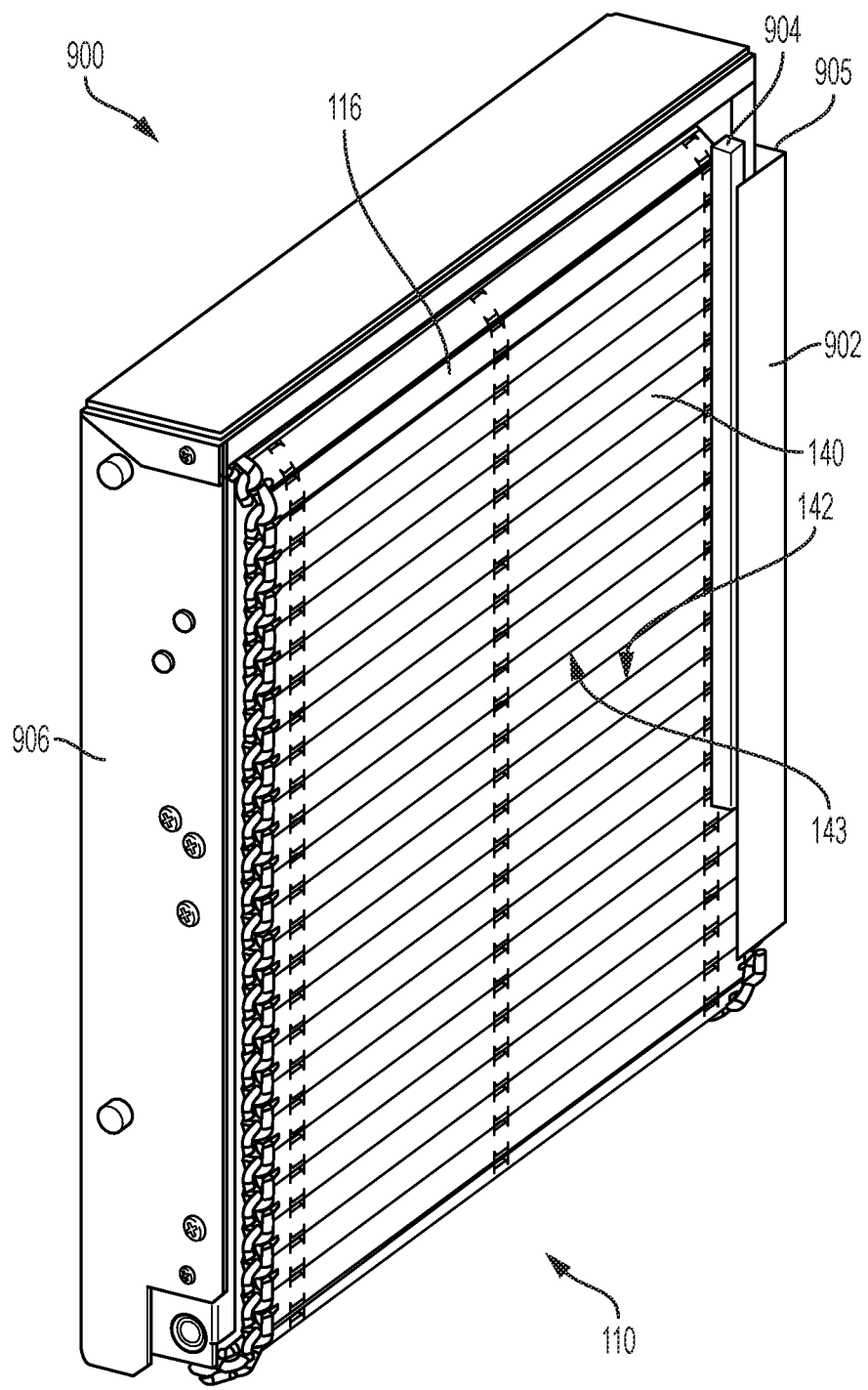
FIG. 10 is a perspective view of the vertical toaster of FIG. 9 with a cover removed revealing the conveyor belt system of FIG. 3 or 5.

The conveyor belt assembly 110, 210 may be used in a horizontal toaster 700 as illustrated in FIG. 7, an angled toaster 800 as illustrated in FIG. 8, or a vertical toaster 901 as illustrated in FIG. 9.

Existing conveyor toasters usually include a product feed where the product is inserted into an opening of the toaster. For example, in the angled toaster 800 in FIG. 8, the product travels down an angled shoot 801, usually angled at about 45 degrees, and is received by a conveyor belt system (not shown in FIG. 8). The conveyor belt system receives the food product and urges it through an opening between the conveyor belt and a heated platen. In some conveyor toasters, the food product is compressed through this opening between the platen and the conveyor belt, also called a compressive gap, to process the food product.

The disclosed conveyor belt assemblies 110, 210 may be used in a vertical toaster 901, as illustrated in FIG. 9. The vertical toaster 901, an example of which is disclosed in U.S. Patent Publication No. 2010/02757789, has a removable and adjustable conveyor belt that receives a food product at an opening at the top of the toaster. As illustrated in FIG. 9, a vertical conveyor belt system 900 may include a guide structure 902 that runs the full length of the conveyor belt. In one embodiment, the conveyor belt system 900 may include a guide structure 902 on both ends of the conveyor belt. A guide bar 904 may be fixed to a bracket 905 that attaches the guide bar 904 to the conveyor belt housing 906. The vertical toaster 901 includes a heating element (not shown), such as a heated platen, for example.

In accordance with a preferred embodiment of the conveyor belt system, the compression gap can be adjusted according to varying sizes of food product. In one embodiment, the conveyor belt can be adjusted with respect to the reactive surface as illustrated and explained in U.S. Patent Publication No. 2010/0275789.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A conveyor belt system for moving a food product through a food preparation device, the conveyor belt system comprising:
    a conveyor belt, the conveyor belt comprising a plurality of spaced rods;
    a plurality of slats, at least one of the slats in the plurality of slats including a flat body portion having a top surface and a bottom surface, the at least one slat including a lateral stop extending from one end of the flat body portion;
    wherein a first slat of the plurality of slats is removably attached to a first spaced rod and a second spaced rod of the plurality of spaced rods of the conveyor belt with a rod connection mechanism, and where the top surface of the first slat extends beyond the first spaced rod and the second spaced rod; and
    wherein a continuous support surface is formed by the top surface of the first slat and the top surface of a second slat adjacent the first slat that is removably attached to a third spaced rod and a fourth spaced rod of the plurality of spaced rods of the conveyor belt.

2. The conveyor belt system of claim 1, wherein the lateral stop extends outward from the flat body portion in a lateral direction.

3. The conveyor belt system of claim 2, wherein the lateral stop includes a plate extension and a downturned wall.

4. The conveyor belt system of claim 3, wherein the plate extension includes edges that taper towards one another extending away from the flat body portion.

5. The conveyor belt system of claim 2, wherein the lateral stop includes a plate extension that includes two legs.

6. The conveyor belt system of claim 5 wherein each leg terminates in a downward wall that extends away from the top surface.

7. The conveyor belt system of claim 6, wherein each leg includes a convex outer surface and a concave inner surface.

8. A food preparation device comprising:
    a housing;
    a heating element located within the housing; and
    a conveyor belt system, the conveyor belt system comprising:
    a conveyor belt, the conveyor belt including a plurality of spaced rods
    a plurality of slats, at least one of the slats in the plurality of slats including a flat body portion having a top surface and a bottom surface between a leading edge and a trailing edge, the at least one slat including a lateral stop extending from one end of the flat body portion;
    wherein the least one slat is removably attached to two adjacent spaced rods of the plurality of spaced rods of the conveyor belt with a rod connection mechanism; and
    wherein the leading edge and the trailing edge extend beyond the adjacent spaced rods.

9. A slat for a conveyor belt system including a conveyor belt, the slat comprising:
    a flat body portion having a top surface and a bottom surface between a leading edge and a trailing edge;
    a lateral stop extending from one end of the flat body portion;
    a rod connection mechanism configured to removably attached the slat to the conveyor belt; and
    wherein the leading edge and the trailing edge extend outward beyond the rod connection mechanism.

10. The slat of claim 9, wherein the lateral stop extends outward from the flat body portion in a lateral direction.

11. The slat of claim 10, wherein the lateral stop includes a plate extension and a downturned wall.

12. The slat of claim 11, wherein the plate extension includes edges that taper towards one another extending away from the flat body portion.

13. The slat of claim 10, wherein the lateral stop includes a plate extension that includes two legs.

14. The slat of claim 13, wherein each leg terminates in a downward wall that extends away from the top surface.

15. The slat of claim 14, wherein each leg includes a convex outer surface and a concave inner surface.

16. The slat of claim 14, wherein each downward wall terminates in a tine.

17. The slat of claim 9, wherein at least of the leading edge and the trailing edge includes an edge wall that extends downward away from the flat body portion.

18. The slat of claim 17, wherein the edge wall tapers inwards towards the opposite one of the leading edge and the trailing edge along the downward direction.

19. The conveyor belt system of claim 9, wherein the rod connection mechanism includes a downturned tab that is punched out of the flat body portion.

20. The conveyor belt system of claim 19, further comprising an opening in the flat body portion proximate the rod connection mechanism.

21. The conveyor belt system of claim 19, wherein the downturned tab includes a curved profile.

* * * * *